(12) United States Patent
Dennis

(10) Patent No.: US 7,273,555 B2
(45) Date of Patent: Sep. 25, 2007

(54) PROCESS FOR CONTINUOUS ION EXCHANGE

(75) Inventor: Richard S. Dennis, Lutz, FL (US)

(73) Assignee: Severn Trent Services, Inc., Tampa, FL (US)

( * ) Notice: Subject to any disclaimer, the term of this patent is extended or adjusted under 35 U.S.C. 154(b) by 277 days.

(21) Appl. No.: 10/449,141

(22) Filed: May 30, 2003

(65) Prior Publication Data

US 2005/0127003 A1 Jun. 16, 2005

(51) Int. Cl.
*B01D 35/14* (2006.01)

(52) U.S. Cl. .................. 210/662; 210/676; 210/677; 210/189; 210/269

(58) Field of Classification Search ............. 210/662, 210/676, 677, 189, 269
See application file for complete search history.

(56) References Cited

U.S. PATENT DOCUMENTS

| | | | | |
|---|---|---|---|---|
| 2,815,322 A * | 12/1957 | Higgins | ............... | 210/676 |
| 2,938,868 A * | 5/1960 | Carlson et al. | ............... | 210/662 |
| 3,194,663 A * | 7/1965 | Higgins | ............... | 426/271 |
| 3,492,092 A * | 1/1970 | Higgins | ............... | 423/321.1 |
| 3,579,322 A * | 5/1971 | Higgins | ............... | 71/34 |
| 3,580,842 A * | 5/1971 | Higgins | ............... | 210/662 |
| 3,969,242 A * | 7/1976 | Kruse | ............... | 210/662 |
| 3,969,243 A * | 7/1976 | Arion | ............... | 210/662 |
| 3,972,810 A * | 8/1976 | Chopra | ............... | 210/676 |
| 3,984,313 A * | 10/1976 | Higgins | ............... | 210/664 |
| 3,993,562 A * | 11/1976 | Kashiwabara et al. | ...... | 210/189 |
| 4,385,993 A * | 5/1983 | Hedrick et al. | ............. | 210/675 |
| 5,277,822 A * | 1/1994 | Higgins | ............... | 210/673 |
| 5,776,340 A * | 7/1998 | Jangbarwala et al. | ....... | 210/274 |

* cited by examiner

*Primary Examiner*—Chester T. Barry
(74) *Attorney, Agent, or Firm*—D'Ambrosio & Associates PLLC; Jo Katherine D'Ambrosio, Jr.

(57) ABSTRACT

A process for continuous countercurrent ion exchange comprises piping a contaminated feed stream into a closed loop ion exchange contactor. The contactor is an ion exchange bed that has three or more reaction segments. The segments are comprised of at least an adsorption segment for treating the contaminated feed stream, a regeneration segment for stripping the contaminant ions from the resin bed, and a pulse segment for advancing the resin bed. Simultaneously, the feed stream is moved through the contactor in the same direction as the regeneration stream. Measuring the quality of this treated feed stream after it exits the contactor monitors the treatment capacity of the resin bed. In response to this quality measurement, the regenerated resin bed is advanced in the pulse segment of the contactor. The spent brine is recycled back to the contactor until the final effluent brine is highly concentrated. After the resin stops advancing, the feed stream and regeneration stream resume flow. Process water is recycled in four different steps of the ion exchange process, for the dilution of acid, as resin rinsing water, for back wash and during the resin pulsing stage.

6 Claims, 2 Drawing Sheets

RESIN PULSING

ION EXCHANGE SERVICE

PROCESS FOR CONTINUOUS ION EXCHANGE

FIELD OF THE INVENTION

The present invention relates to a process for continuous countercurrent ion exchange. More particularly to a process for an environmentally efficient continuous countercurrent ion exchange within a closed loop ion exchange contactor.

BACKGROUND OF THE INVENTION

Ion exchange methods using a closed loop system have been utilized for a variety of industrial and agricultural processes to remove unwanted anions and cations from solutions. The continuous operation of ion exchange reaction units having moving beds has been taught by I. Higgins in a multitude of patents including U.S. Pat. No. 3,194,663 for the radioactive decontamination of milk, U.S. Pat. No. 3,492,092 for an ion exchange process for treating crude mineral solutions, U.S. Pat. No. 3,579,322 for the recovery of phosphate from phosphate containing pond water, U.S. Pat. No. 3,580,842 for a downflow ion exchange, U.S. Pat. No. 3,677,937 for a split loop contactor, U.S. Pat. No. 3,775,088 for a process for treating fertilizer plant waste streams, U.S. Pat. No. 3,984,313 for a process for removing ammonia and phosphates from sewage water, and U.S. Pat. No. 5,277,822 for the extraction of thermally stable contaminants from stack gas scrubbing amines.

The Higgins system for ion exchange teaches a continuous, countercurrent, exchange column loop system in which removal or recovery of a targeted cation or anion occurs in one section and the regeneration of resin in another. Two or more liquids of differing specific gravity contact particulate solids in a closed system with little or no dilution and intermixing. A continuous ion exchange apparatus performs both ion exchange treatment and regeneration treatment within a single looped column by the use of ion exchange resin whose ion exchange abilities can be regenerated by acid, salt or alkali. The typical Higgins apparatus comprises unshaped closed tube having an adsorption or treatment zone, a washing or rinsing zone, a regenerating zone and in more current versions, a pulsing zone. The zones or sections are separated by valves. After the resin is regenerated, the influent flow of solution to be treated and regeneration flow are interrupted and the ion exchange resin bed is shifted from one section to another contiguous section so that a portion of the resin in the treatment zone is replaced with regenerated resin.

Later continuous ion exchange systems that employ the Higgins Loop™, a trademark of Tetra Process Technologies, a Severn Trent Services Company, incorporate a pulse cycle to hydraulically move the spent resin out to the treatment vessel and move regenerated resin into the vessel. Chopra in U.S. Pat. Nos. 3,972,810, 4,057,494, Removal of Chromium Chromate Molybdate and Zinc utilizes the Higgins Loop™ system.

Kashiwabara et al. in U.S. Pat. No. 3,993,562 uses a loop-style continuous ion exchange unit having a liquid treating section, a material weighing and transfer section, a regeneration section, a washing section and a back-washing section. The back-washing section is above the liquid treating section to enable material to fall by gravity into the liquid treating section. The liquid treating section is located above the material weighing and transfer section so that material can fall by gravity into the material weighing and transfer section.

Iwatsuka, et al., U.S. Pat. No. 5,580,445 discloses a continuous ion exchange apparatus capable of performing both ion exchange treatment and regeneration treatment within a single column by the use of ion exchange resin(s) whose ion exchange abilities can be regenerated by acid or alkali. A resin extraction transfer means is used for withdrawal of the ion exchange resin from the bottom of the column and transferring them to a metering container disposed on the top of the column and a regenerant passage system allowing the supply of the regenerant from the bottom of the regeneration zone into the interior of the column and discharge of regenerant waste from the top of the regeneration zone to the exterior of the column.

None of these references, however, teach or suggest a continuous counter current ion exchange within a closed loop that automatically adjusts resin regeneration and reduces the significant amount of environmental wastes generated by the system. Arion, in U.S. Pat. Nos. 3,956,115 and 4,002,455 discloses a complex process for regeneration of ion exchange resins and recovering waste water from the fertilizer manufacturer. This process requires extensive equipment and at least 24 steps to accomplish.

SUMMARY OF THE INVENTION

The present invention relates to the discovery of an environmentally efficient continuous countercurrent ion exchange that removes contaminants from liquid solutions, waste waters for example, while significantly reducing the waste streams resulting from the process. The process treats a contaminated feed stream using a Higgins Loop™ closed loop contactor. Advantageously, the process of this invention uses a quality measurement system that reduces the amount of acid used during the process and beneficially produces a spent brine stream that is useful in other industrial processes thereby eliminating a waste stream into the environment. An additional water waste stream is eliminated because wastewater is recycled back into the contractor during the steps of this process rather then being piped out as a waste.

The contractor comprises an adsorption area or section for treating the contaminated stream, a regeneration area comprising ion exchange resin for stripping the contaminant ions from the stream and a pulse area for advancing a resin bed. Advantageously, the ion exchange contactor of the present invention monitors the quality of the effluent treated stream after it exits the contactor and, in response to the quality measurement, advances the regenerated resin bed so that fresh resin is available within the adsorption section when needed and additional acid is not added prematurely.

One preferred embodiment of a process for continuous countercurrent ion exchange comprises piping a contaminated feed stream into a closed loop ion exchange contactor. The contactor is an ion exchange bed that has three or more reaction segments. The segments are comprised of at least an adsorption segment for treating the contaminated feed stream, a regeneration segment for stripping the contaminant ions from the resin bed, and a pulse segment for advancing the resin bed.

Simultaneously, the feed stream is moved through the contactor in the same direction as the regeneration stream. Measuring the quality of this treated feed stream after it exits the contactor monitors the treatment capacity of the resin bed. In response to this quality measurement, the regenerated resin bed is advanced in the pulse segment of the contactor. After the resin stops advancing, the feed stream and regeneration stream resume flow.

Another preferred embodiment of a process for continuous countercurrent ion exchange comprises piping a contaminated feed stream into a closed loop ion exchange contactor. This contactor is also an ion exchange bed having three or more reaction segments. The segments are comprised of at least an adsorption segment for treating the contaminated feed stream, a regeneration segment for stripping the contaminant ions from the resin bed, and a pulse segment for advancing the resin bed.

A resin regeneration stream is moved through the resin bed within the loop contactor in one direction. Simultaneously, the contaminated feed stream moves through the contactor in the same direction as the regeneration stream. The contaminated feed stream flows through the adsorption segment. In this segment, the resin bed treats the contaminated feed stream as the stream flows through the bed. The treated feed or clean water stream is then piped out of the contactor.

Measuring the pH of the treated feed stream after it exits the contactor monitors the treatment capacity of the resin bed. In response to this pH measurement, the regenerated resin bed is advanced in the pulse segment of the contactor. Advancing the resin bed comprises stopping the flow of the feed stream and the resin regeneration stream, and hydraulically displacing a portion of the resin bed so that regenerated resin moves in the opposite direction of the feed stream and regeneration stream flows. After the resin stops advancing, the feed stream and regeneration stream resume flow.

In another preferred embodiment of a process for continuous countercurrent ion exchange, the step of measuring the quality of the treated feed stream comprises measuring the conductivity of the treated feed stream after it exits the contactor to monitor the treatment capacity of the resin bed. In response to this conductivity measurement, the regenerated resin bed is advanced in the pulse segment of the contactor. Advancing the resin bed comprises stopping the flows of the feed stream and the resin regeneration stream, and hydraulically displacing a portion of the resin bed so that regenerated resin moves in opposite direction of the feed stream and regeneration stream flows. After the resin stops advancing, the feed stream and regeneration stream resume flow.

Another preferred embodiment of a process for continuous countercurrent ion exchange comprises piping a contaminated feed stream into a closed loop cation exchange contactor. The contactor has at least an adsorption segment, a regeneration segment, and a pulse segment. It can also comprise a rinse segment and a backwash segment. A resin regeneration stream is moved through the resin bed within the loop contactor in one direction. Adding acid to the resin bed in the regeneration segment regenerates the hydrogen ion content of the resin by contacting the resin with the acid. A portion of the spent brine solution recycles back into the contactor to concentrate the resulting end product, spent brine solution. The spent brine solution is comprised of excess unused acid that is recycled to be used for regeneration of the resin bed.

Simultaneously, the contaminated feed stream moves through the contactor in the same direction as the regeneration stream. The contaminated feed stream flows through the adsorption segment for ion exchange treatment. In this segment, the resin bed treats the feed stream as the stream flows through the bed. The treated feed stream is then piped out of the contactor. Activation of the pulse segment in response to quality monitoring stops the feed stream flow and the regeneration stream flow and advances the regenerated resin bed. After the resin stops advancing, the feed stream and regeneration stream resume flow.

In still another preferred embodiment of a process for continuous countercurrent ion exchange, a resin regeneration stream is moved through the resin bed within the loop contactor in one direction. Adding acid to the resin bed in the regeneration segment regenerates the hydrogen ion content of the resin by contacting the resin with the acid. A portion of the spent brine solution recycles back into the contactor so that the resulting brine end product is concentrated. In this embodiment, excess unused acid within the spent brine solution is also recycled into the regeneration section to minimize acid usage. A minimum flow volume is maintained throughout the regeneration segment by recycling the spent brine solution.

Another preferred embodiment of a process for continuous countercurrent ion exchange comprises piping a contaminated feed stream into a closed loop anion exchange contactor. In this embodiment, the contactor is an anion exchange bed that has three or more reaction segments, an adsorption segment, a regeneration segment, and a pulse segment. Each segment is separated from the other segments segment separated from the other segments by one or more a valves.

A resin regeneration stream is moved through the resin bed within the loop contactor in one direction. Adding an alkali to the resin bed in the regeneration segment regenerates the anion content of the resin by contacting the resin with the alkali. A portion of the spent brine solution recycles back into the regeneration section.

The feed stream moves through the contactor in the same direction as the regeneration stream so that the feed stream is treated within the resin bed of the ion exchange segment. Activating the pulse segment in response to quality monitoring stops the flow of the feed stream and advances the regenerated resin. The feed stream flow and regeneration stream flow resume after the resin stops advancing.

In another preferred embodiment of a process for continuous countercurrent ion exchange, a portion of the contaminated feed stream is piped to a rinse area. The stream is then used to rinse the regenerated resin stream before the embedded regenerated resin stream enters the adsorption section. Beneficially, less clean water is required then in prior closed loop ion exchange systems and less wastewater is produced as effluent to be disposed.

Another preferred process for continuous countercurrent ion exchange also reduces and helps to eliminate a wastewater stream by recycling spent pulse water. This embodiment comprises piping a contaminated feed stream into a closed loop ion exchange contactor. The contactor is an ion exchange bed that has three or more reaction segments. The segments are comprised of at least an adsorption segment, a regeneration segment, and a pulse segment.

A resin regeneration stream is moved through the resin bed within the loop contactor in one direction. Simultaneously, the feed stream moves through the contactor in the same direction as the regeneration stream.

Measuring the quality of the treated feed stream after the treated feed stream exits the contactor monitors the treatment capacity of the resin bed. In response to this quality measurement, the regenerated resin bed is advanced in the pulse segment of the contactor. Advancing the resin bed comprises stopping the flow of the feed stream and the resin regeneration stream, and hydraulically displacing a portion of the resin bed so that regenerated resin moves in the opposite direction of the feed stream and regeneration stream flows. The feed stream flow and regeneration stream flow resume after the resin stops advancing.

The spent pulse water is piped back to the pulse tank system for reuse as pulse water and in diluting the acid regenerant, thereby eliminating a wastewater stream.

In one further embodiment of a process for continuous countercurrent ion exchange both excess acid and process water are recycled thereby reducing or eliminating waste streams. This embodiment comprises piping a contaminated feed stream into a closed loop ion exchange contactor having at least an adsorption segment, a regeneration segment, and a pulse segment.

A resin regeneration stream is moved through the resin bed within the loop contactor in one direction. Adding acid to the resin bed in the regeneration segment regenerates the hydrogen ion content of the resin by contacting the resin with the acid. A portion of the spent brine solution recycles back into the contactor so that the resulting brine end product is concentrated. Excess unused acid within the spent brine solution recycles into the regeneration section to minimize acid usage.

The feed stream is simultaneously moved through the contactor in the same direction as the regeneration stream. A portion of the contaminated feed stream is piped to a rinse area to rinse the regeneration stream before the regeneration stream enters the adsorption section.

The quality of the treated feed stream is measured after the treated feed stream exits the contactor so that the treatment capacity of the resin bed is continuously monitored. In response to this quality measurement, the regenerated resin bed is advanced in the pulse segment of the contactor. The spent pulse water is piped back to the pulse tank system for reuse as pulse water and for diluting the acid regenerant, eliminating a wastewater stream.

DETAILED DESCRIPTION OF THE PREFERRED EMBODIMENTS

The process and apparatus for continuous ion exchange of the present invention is environmentally efficient in that it removes contaminants from liquid solutions, waste waters for example, while significantly reducing or eliminating the waste streams typically resulting from the process. Recycling the spent brine stream, water and acids used in the process reduces or eliminates the volume of effluent waste streams, and in some cases, turned them into useable end products.

Figure 1:
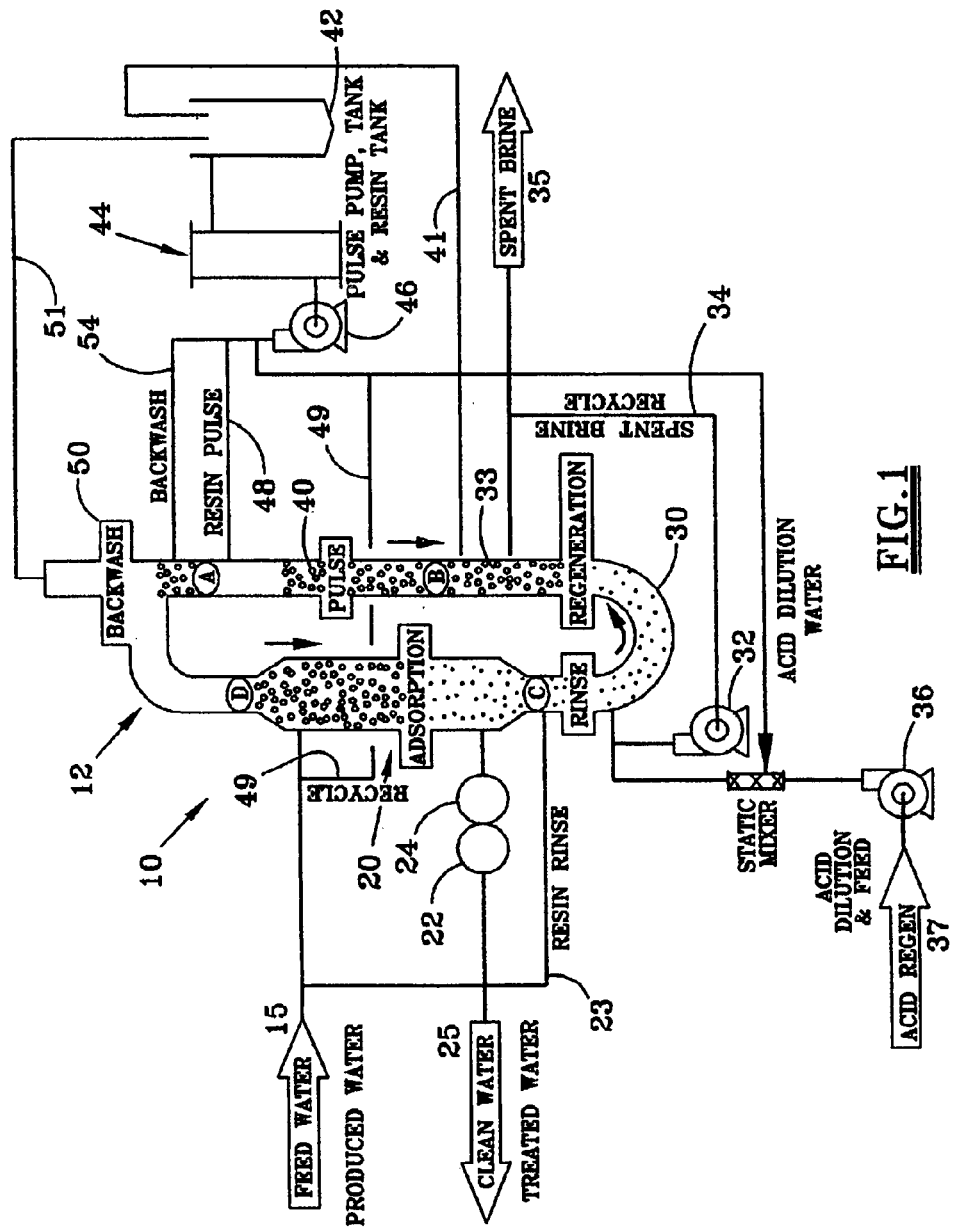
FIG. 1 is a schematic of one embodiment of this invention.

Referring to the FIG. 1, a contaminated feed stream 15 is piped to a Higgins Loop™ closed loop contactor 12. The feed stream can comprise any solution having ions that need to be removed from the solution, metals such as sodium or potassium for example, either because of environmental concerns or for purposes of concentrating the remaining ions in the stream. The various embodiments of this invention can encompass metal or ion extraction from such processes as ore leach or wastewater demineralization. The present invention can also be used in nitrate removal from drinking water, and ammonia and nitrate removal municipal or industrial wastewater streams.

In one preferred embodiment, the continuous ion exchange contactor 12 comprises a packed resin bed 33 contained in a closed loop. The resin bed 33 can comprise either cation or anion ion exchange resins. With a cation ion exchange resin, the ions in the feed stream to be exchanged are any positively charged elements or molecules. In an anion ion exchange resin bed, the ions in the feed stream to be exchanged are any negatively charged elements or molecules. FIG. 1 illustrates a cation resin bed 33 wherein the feed stream is wastewater 15 contaminated with cations and the ion exchange resin is an acid resin. The process of this invention can be used for either cation ion exchange, or anion ion exchange.

The closed loop contractor 12 comprises three or more sections, an adsorption area or section 20 for treating the contaminated feed stream 15, a regeneration segment 30 for stripping the contaminant ions from the resin bed 33 and a pulse segment 40 for advancing the resin bed 33. In one embodiment, the feed stream 15 flows through the adsorption section 20 in a counter-clockwise direction. The ion exchange occurs in the adsorption section 20 so that the contaminants are converted to a salt (in this example) and the treated water is piped out as clean water 25. For illustrative purposes only without limiting the scope of this invention, if the contaminant is a sodium chloride, the resin comprises an acid, H—R to produce hydrochloric acid and a sodium salt.

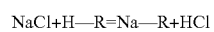

NaCl+H—R=Na—R+HCl

Acids used in the resin bed can include hydrochloric acid, sulfuric acid, and nitric acid.

Advantageously, the ion exchange contactor 12 of the present invention monitors the quality of the effluent treated water stream 25 after it discharges from the contactor 12. When the resin is exhausted as indicated by measuring the quality of the discharged treated water, the pulse section 40, in response to the quality measurement, advances the regenerated resin bed 33 so that fresh resin is available within the adsorption section 20 when needed thereby preventing excessive water treatment. Advantageously, additional acid or alkali is not added prematurely but only as indicated by the quality measurement thereby minimizing excess acid or alkali neutralization usage.

Figure 3:
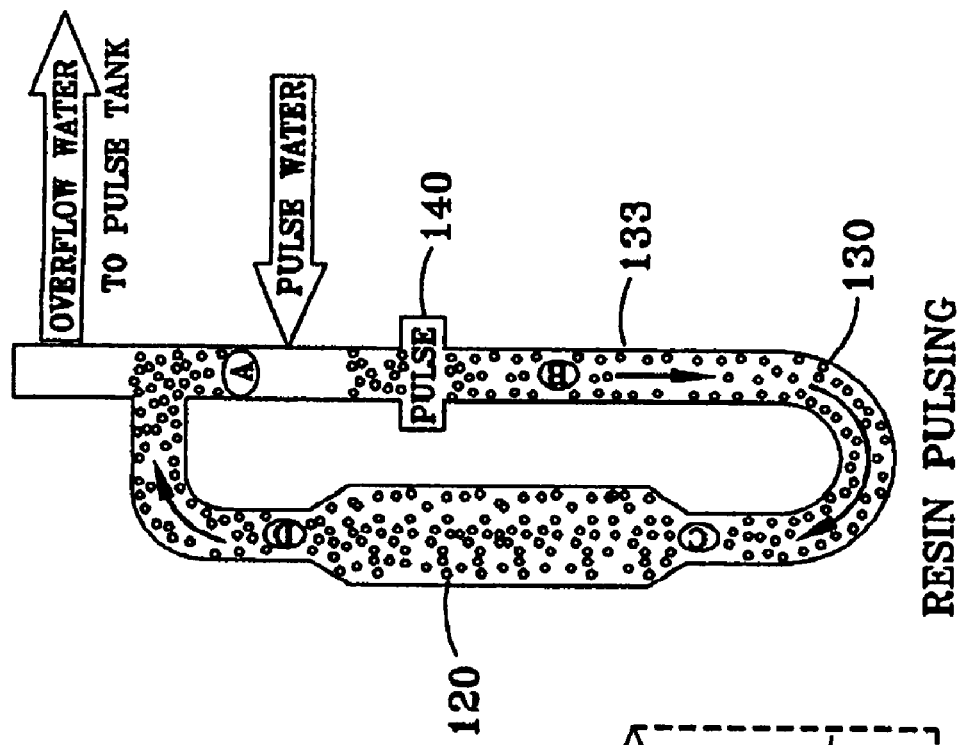
FIG. 3 is a schematic of one embodiment of this invention illustrating resin pulsing.

As the treated water is piped out of the closed loop contactor after moving through the adsorption sector 20, it passes through a quality measurement meter 22, 24 to monitor the quality of the treated water 25. The meter can be a pH meter 22 or a conductivity meter 24 or both. When the pH or conductivity increase above acceptable levels, a signal is sent to the pulse pump 46 to pulse a water stream into the pulse section 40 of the closed loop 12 that hydraulically moves the resin bed 33 in a clockwise direction, as illustrated in FIG. 3, so that regenerated resin is then move into the adsorption section 20.

Below the adsorption section 20 is a regeneration section 30 comprising ion exchange resin for stripping the contaminant ions from the stream. Within the regeneration section 30, a resin regeneration stream is moved through the resin bed 33 within the closed loop contactor 12 in a counter-clockwise direction (as is the feed stream in the adsorption section). Acid is added to the resin bed 33 in the regeneration segment thereby restoring the hydrogen ion content of the resin as the resin is contacted with the acid. The resulting brine also referred to as the spent brine 34 is piped out of the closed loop contactor 12. The feed stream is simultaneously moved through the contactor 12 in same direction as the regeneration stream.

Advantageously, the novel process of this invention recycles a portion of the spent brine solution back into the contactor 12 through pump 32 so that the resulting brine end product is concentrated into a usable product rather than a waste stream requiring special disposal to comply with EPA regulations. The small, end product spent brine stream comprising concentrated adsorbed metal ions can be concentrated to a density of at least 1.10 g/cc, and preferably, 1.18 g/cc thereby turning the spent brine steam into a high density brine stream that is a usable end product, such as a kill brine solution for use in abandoned oil wells. The high density brines can be used wherever such products are needed.

Another novel feature of this process is that excess unused acid within the spent brine solution is also recycled and regenerated acid 37 enters pump 36 to be piped back to the closed loop contactor 12. After mixing the regeneration acid with acid dilution water, it is mixed with spent brine solution and piped into the regeneration section 30 to minimize overall acid usage. Acid dilution water is added to maintain a required minimum flow volume in the regeneration section 30. The recycled spent brine also helps to maintain minimum flow volume. Beneficially, the acid dilution water is also recycled water from the closed loop contractor 12 as is described below.

Figure 2:
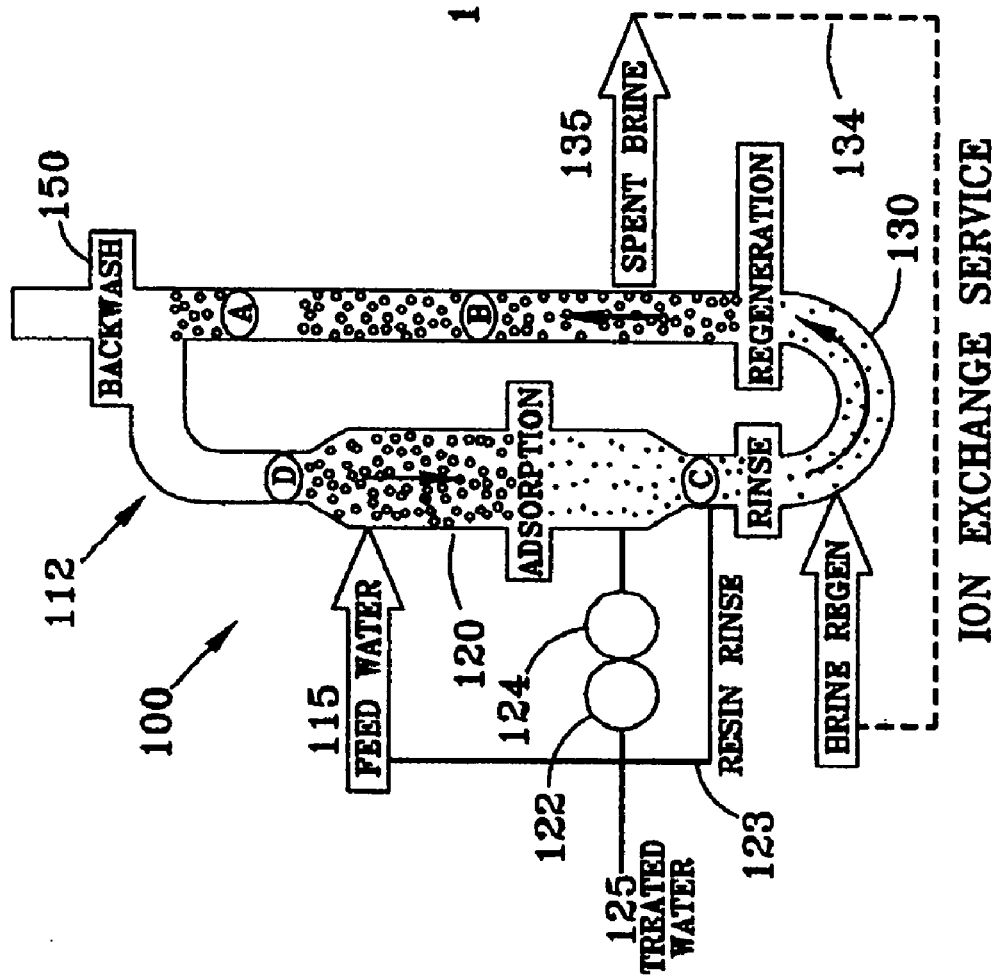
FIG. 2 is a schematic of another embodiment of the ion exchange of this invention.

Referring to FIGS. 1, 2, and 3, the closed loop contactor 12 of the present invention is called a continuous counter-current ion exchange system because the feed stream and regeneration resin stream move in a counter-clock wise direction during the treatment and regeneration phases and the resin pulse stream advancing the regenerated resin moves clockwise during the pulse stage. Valves B, C and D are open during the pulse stage. Valve A is closed. During the ion exchange stage, all valves are closed to avoid cross contamination between the sections or zones.

Advancement of the resin stream occurs as follows: when the resin in the adsorption section 20 is exhausted, the pH meter 22 or conductivity meter 24 sends a signal to the pulse pump 46 to hydraulically move a portion of regenerated resin into the adsorption section 20. To this end, the closed loop contactor 12 further comprises a pulse section for advancing the resin bed 33. When the pH meter 22 or conductivity meter 24 measures the quality of the treated water 25, a signal is sent to the pulse tank system 42, 44, 46 to automatically advance the resin bed. The flowing of the feed stream and the resin regeneration stream stops in response to the quality measurement signal.

The resin pulse system 42, 44, 46 is activated and the pulse segment 40, in response to the quality measurement from the pH meter 22 or conductivity meter 24, hydraulically displaces a portion of the resin bed 33 so that regenerated resin is moved in a direction opposite the direction of the feed stream and regeneration stream. A pulse tank system, 42, 44, 46 is used to pipe water into the pulse section 40. The pulse tank system 42, 44, 46 receives recycled water as spent pulse water back is piped back to the pulse tank system 42, 44, 46 from the regeneration section 30 and the backwash section 50. The pulse tank system 42, 44, 46 pipes a portion of the recycled water to the acid dilution feed pump for use in diluting the acid regenerant. Another portion of the water leaving the pulse pump is recycled 49 back to the contaminated feed water stream 15. Sending water back to the feed stream 15 and utilizing the recycled water to hydraulically pulse the regenerated resin as well as for acid dilution water to maintain the minimum flow volume, eliminates a wastewater stream.

The flow of the feed stream and regeneration stream resume after the resin has stopped advancing. In another innovative aspect of this process, the regenerated resin bed is rinsed prior to entering the adsorption section to remove excess acid regenerant. To this end, a portion of the contaminated feed stream 15 is used as resin rinse water 23 in order to prevent acid losses. Ultimately, the feed water is recycled four times in auxiliary resin treatment processes: as resin rinse water, acid dilution water, pulse water and backwash water, without generating an additional wastewater stream.

Referring to FIGS. 2 and 3, another preferred embodiment of this process is used for anion exchange 100. In this process, a contaminated feed stream 115 is piped into a closed loop anion exchange contactor 112. The contactor is an ion exchange bed that has three or more reaction segments, an adsorption segment 120, a regeneration segment 130, and a pulse segment 140. Each segment is separated from the other segments by one or more a valves A, B, C and D.

A resin regeneration stream is moved through the resin bed 133 within the loop contactor in one direction, counter-clockwise. An alkali is added to the resin bed 133 in the regeneration segment 130 to regenerate the anion content of the resin by contacting the resin with the alkali. A portion of the spent brine solution 134 is recycled back into the regeneration section 130.

Simultaneously, the feed stream 115 moves through the contactor 112 in the same direction, counter-clockwise, as the regeneration stream so that the feed stream 112 is treated within the resin bed 133 within the adsorption section 120. Activating the pulse segment 140 stops the flow of the feed stream 115 and advances the regenerated resin 133. The feed stream flow and regeneration stream flow resume after the resin has stopped advancing. Preferably, a minimum flow volume flow is maintained throughout the regeneration segment 133 by recycling a portion of the spent brine solution through the regeneration segment. In one preferred embodiment, the contaminant is nitrate and the regenerant is chloride brine.

Advantageously, the process of this embodiment also uses a quality measurement system, either a pH meter and/or a conductivity meter that measures the quality of the treated water 125 exiting the anion contactor 112. If the quality of the treated water does not measure up to preset benchmarks of pH or conductivity, signals are automatically generated that activate the pulse phase of this process into action. Valves B, C, and D are opened and the pulse pump is activated to pulse water into the pulse section 140 so that the regenerated resin 133 is advanced into the adsorption section 120. This novel aspect of the process reduces the amount of alkali used during the process and beneficially produces a spent brine stream that is useful in other industrial processes thereby eliminating a waste stream into the environment. An additional water waste stream is eliminated because process water is recycled back into the contractor during four of the steps of this process (alkali dilution water, spent brine solution, backwash water and pulse water) rather then being piped out as a waste.

The apparatus for a continuous countercurrent ion exchange contactor system comprises a closed loop ion exchange contactor 12, comprising an ion exchange resin bed 33. The contactor 12 further comprising three or more reaction segments, an adsorption segment 20, a regeneration segment 30 and a pulse segment 40. The system further comprises means for recycling a portion of the spent brine solution back into the contactor so that the resulting brine end product is concentrated. The means comprise piping 34 and pumps 32. Means for recycling the excess unused acid within the spent brine solution into the regeneration section to minimize acid usage comprise piping 34 and a spent brine solution pump system 36.

The contactor system 10 further comprises piping means 23 to transport a portion of the contaminated feed stream to a rinse area to rinse the regenerated resin stream before the regenerated resin stream enters the adsorption section 20. A means for monitoring the treatment capacity of the resin bed by measuring the quality of the treated feed stream after the treated feed stream exits the contactor can comprise a pH meter 22 or a conductivity meter 24 or both. In one aspect, the contactor system 10 comprises means for automatically advancing the resin bed in the pulse segment in response to the quality measurement. The means can comprise computers, piping and the pulse tank system 42, 44, 46. Piping means, pipes, 41 recycle the spent pulse water back to the pulse tank system 42, 44, 46 for use as pulse water and diluting the acid regenerant to eliminate a wastewater stream.

The various embodiments of this invention can be used in many industrial processes including metal or ion extraction such as ore leach, metal demineralization of industrial or municipal wastewaters; waste phosphoric acid processes for purification of fertilizers removing calcium, cadmium, iron, potassium magnesium and sodium, acid defluorination and sulfuric acid removal. The present invention can also be used in nitrate removal from drinking water, and ammonia and nitrate removal municipal or industrial wastewater streams as well as sodium, chloride and sulfate removal from gas well produced waters.

The foregoing description is illustrative and explanatory of preferred embodiments of the invention, and variations in the size, shape, materials and other details will become apparent to those skilled in the art. It is intended that all such variations and modifications, which fall within the scope or spirit of the appended claims, be embraced thereby.

The invention claimed is:

1. A process for continuous countercurrent ion exchange comprising:
   a. piping a contaminated feed stream into a closed loop cation exchange contactor, the contactor comprising an ion exchange resin bed, the contactor further comprising three or more reaction segments, the segments comprising at least an adsorption segment, a regeneration segment and a pulse segment, each segment separated from the other segments by one or more valves;
   b. moving a resin regeneration stream through the resin bed within the loop contactor in one direction, adding acid to the resin bed in the regeneration segment, regenerating the hydrogen ion content of the resin by contacting the resin with the acid;
   c. recycling a portion of the resin regenerative stream comprising excess unused acid back into the contactor to concentrate the resulting end product spent brine and use the excess acid as a resin bed regenerant, the step of recycling comprising mixing regeneration acid with acid dilution water and combining the resulting mixture with the spent brine;
   d. simultaneously moving the feed stream through the contactor in same direction as the regeneration stream, piping the contaminated feed stream through the adsorption segment, treating the feed stream by flowing the stream through the resin bed and piping the treated feed stream out of the contactor;
   e. stopping the flowing of the feed stream and the regeneration stream and advancing the regenerated resin bed by activating the pulse segment;
   f. resuming the flow of the feed stream and regeneration stream after the resin has stopped advancing.

2. The process of claim 1 wherein the end product spent brine comprises a density of at least 1.10 g/cc.

3. A process for continuous countercurrent ion exchange comprising:
   a. piping a contaminated feed stream into a closed loop cation exchange contactor, the contactor comprising an ion exchange resin bed, the contactor further comprising three or more reaction segments, the segments comprising at least an adsorption segment, a regeneration segment and a pulse segment;
   b. moving a resin regeneration stream through the resin bed within the loop contactor in one direction, adding acid to the resin bed in the regeneration segment, regenerating the hydrogen ion content of the resin by contacting the resin with the acid;
   c. recycling a portion of the resin regenerative stream comprising excess unused acid back into the contactor to concentrate the resulting end product spent brine and use the excess acid as a resin bed regenerant, the step of recycling comprising mixing regeneration acid with acid dilution water and combining the resulting mixture with the spent brine;
   d. maintaining a minimum flow volume throughout the regeneration segment by recycling resin regenerative stream;
   e. simultaneously moving the feed stream through the contactor in same direction as the regeneration stream so that the feed stream is treated within the resin bed;
   f. monitoring the treatment capacity of the resin bed by measuring the quality of the treated feed stream after the treated feed stream exits the contactor;
   g. advancing the regenerated resin bed in response to the quality measurement; and
   h. resuming the flow of the feed stream and regeneration stream after the resin has stopped advancing.

4. The process of claim 3 wherein the step of measuring the quality of the treated feed stream comprises measuring the pH of the stream.

5. The process of claim 3 wherein the step of measuring the quality of the treated feed stream comprises measuring the conductivity of the stream.

6. A process for continuous countercurrent ion exchange comprising:
   a. piping a contaminated feed stream into a closed loop ion exchange contactor, the contactor comprising an ion exchange resin bed, the contactor further comprising three or more reaction segments, the segments comprising at least an adsorption segment, a regeneration segment and a pulse segment;
   b. moving a resin regeneration stream through the resin bed within the loop contactor in one direction;
   c. simultaneously moving the feed stream through the contactor in same direction as the regeneration stream, piping the contaminated feed stream through the adsorption segment, treating the feed stream by flowing the stream through the resin bed and piping the treated feed stream out of the contactor;
   d. piping a portion of the contaminated feed stream to a rinse area to rinse the regeneration stream before the regeneration stream enters the adsorption section;
   e. stopping the flowing of the feed stream and the regeneration stream and advancing the regenerated resin bed by activating the pulse segment;
   f. resuming the flow of the feed stream and regeneration stream after the resin has stopped advancing.

* * * * *